(12) United States Patent
Neri et al.

(10) Patent No.: US 10,602,578 B1
(45) Date of Patent: Mar. 24, 2020

(54) HORTICULTURE FACILITIES WITH CENTRALIZED POWER SUPPLIES FOR POWERING LED LUMINAIRES VIA POWER TRANSFER SWITCHES

(71) Applicant: Astec International Limited, Kowloon (HK)

(72) Inventors: Nathaniel Franco Neri, Mandaluyong (PH); John Faustino Boqueo Begino, III, Pasig (PH); Christopher Alan Jones, Queen Creek, AZ (US); An Kim Nguyen, Saint Brea, CA (US)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 16/429,864

(22) Filed: Jun. 3, 2019

(51) Int. Cl.
*H05B 33/08* (2006.01)
*A01G 7/04* (2006.01)

(52) U.S. Cl.
CPC ......... *H05B 33/0815* (2013.01); *A01G 7/045* (2013.01); *H05B 33/0842* (2013.01); *H05B 33/0887* (2013.01)

(58) Field of Classification Search
CPC ............ H05B 33/0815; H05B 33/0887; H05B 33/0842; A01G 7/045
USPC ....................................................... 315/210
See application file for complete search history.

(56) References Cited

U.S. PATENT DOCUMENTS

| | | | |
|---|---|---|---|
| 6,807,073 B1 * | 10/2004 | Scarlatescu | H02M 1/4225 363/34 |
| 7,633,770 B2 * | 12/2009 | Datta | H02M 7/49 363/35 |
| 9,131,581 B1 | 9/2015 | Hsia et al. | |
| 9,320,093 B2 | 4/2016 | Tikkanen et al. | |
| 9,787,175 B2 | 10/2017 | Phadke | |
| 2005/0174473 A1 | 8/2005 | Morgan et al. | |
| 2009/0040791 A1 * | 2/2009 | Qahouq | H02M 3/1588 363/21.01 |

(Continued)

FOREIGN PATENT DOCUMENTS

CN 103762712 B 5/2016

OTHER PUBLICATIONS

Centralized Power Supply System; AD Lighting; Mar. 8, 2017; pp. 265-268.

*Primary Examiner* — Don P Le
(74) *Attorney, Agent, or Firm* — Harness, Dickey & Pierce, P.L.C.

(57) ABSTRACT

A horticulture facility includes a first set of LED luminaires disposed in a grow room of the horticulture facility, a second set of LED luminaires disposed in another grow room of the horticulture facility, a centralized power supply and power transfer switches. The power supply includes DC/DC power converters each having an output. The power transfer switches include a first power transfer switch coupled to the output of one respective DC/DC power converter of the DC/DC power converters. The first power transfer switch is configured to switch between a first position for coupling the output of the respective DC/DC power converter to the first set of LED luminaires, and a second position for coupling the output of the respective DC/DC power converter to the second set of LED luminaires. Other example horticulture facilities and electric power systems are also disclosed.

19 Claims, 8 Drawing Sheets

(56) References Cited

U.S. PATENT DOCUMENTS

| | | |
|---|---|---|
| 2012/0092898 A1* | 4/2012 | Raju ................ H02M 3/33561 363/17 |
| 2012/0280637 A1 | 11/2012 | Tikkanen et al. |
| 2013/0069606 A1* | 3/2013 | Wachter ................ H02M 3/158 323/234 |
| 2013/0147367 A1* | 6/2013 | Cowburn ........... H05B 37/0254 315/152 |
| 2015/0035284 A1* | 2/2015 | Yang ..................... H02M 5/42 290/55 |
| 2015/0048758 A1 | 2/2015 | Carrigan et al. |
| 2015/0054417 A1 | 2/2015 | Lee |
| 2015/0102671 A1* | 4/2015 | Rivera .................... H02M 7/06 307/31 |
| 2015/0327340 A1 | 11/2015 | Siessegger et al. |
| 2016/0057824 A1 | 2/2016 | Hu et al. |
| 2017/0110877 A1* | 4/2017 | Reddy ..................... H02J 1/12 |
| 2017/0202062 A1 | 7/2017 | Choi |
| 2017/0245341 A1 | 8/2017 | Lee |

* cited by examiner

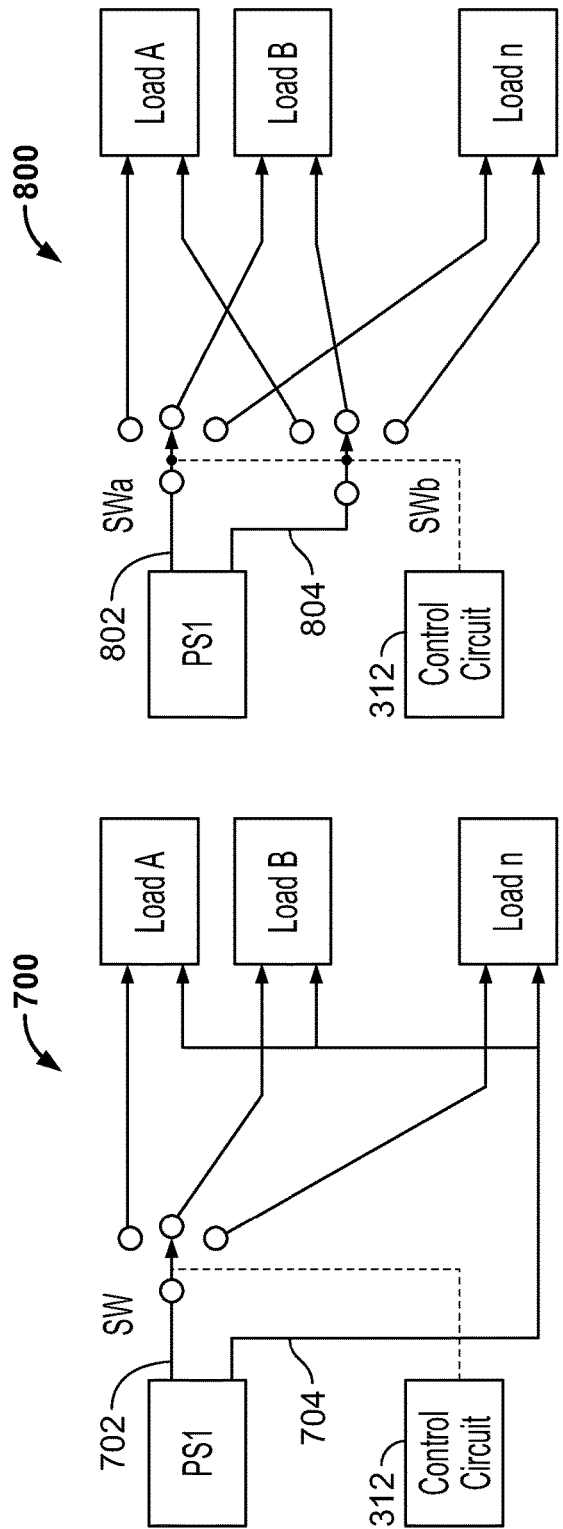
FIG. 8
FIG. 7
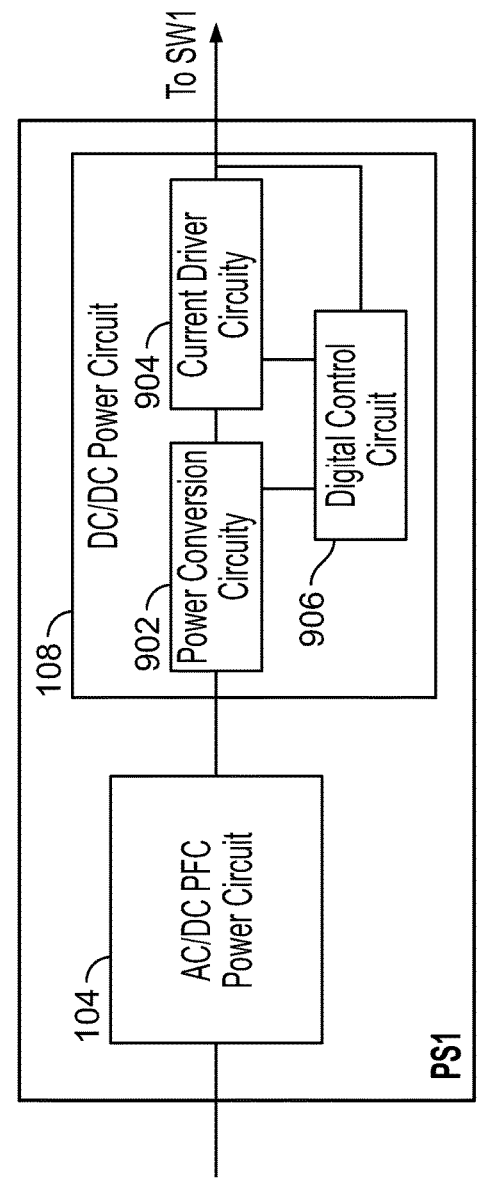
FIG. 9

HORTICULTURE FACILITIES WITH CENTRALIZED POWER SUPPLIES FOR POWERING LED LUMINAIRES VIA POWER TRANSFER SWITCHES

FIELD

The present disclosure relates to horticulture facilities with centralized switched mode power supplies for powering LED luminaires via power transfer switches.

BACKGROUND

This section provides background information related to the present disclosure which is not necessarily prior art.

Electric power systems may include a centralized switched mode power supply (SMPS) for powering one or more light emitting diode (LED) luminaires. In such examples, the centralized SMPS provides a low voltage output such as 60 VDC to each LED luminaire. Additionally, each LED luminaire is powered by its own dedicated DC source in the centralized SMPS such that a ratio of DC sources to LED luminaires is 1:1.

SUMMARY

This section provides a general summary of the disclosure, and is not a comprehensive disclosure of its full scope or all of its features.

According to one aspect of the present disclosure, an indoor horticulture facility utilizing a plurality of LED luminaires for growing plants in one or more grow rooms is disclosed. The indoor horticulture facility includes a first set of LED luminaires of the plurality of LED luminaires disposed in a grow room in the indoor horticulture facility, a second set of LED luminaires of the plurality of LED luminaires disposed in another grow room in the indoor horticulture facility, a centralized SMPS, and a plurality of power transfer switches. The first set of LED luminaires is configured to provide light to at least one plant in the grow room, and the second set of LED luminaires is configured to provide light to at least one plant in the other grow room. The centralized SMPS includes a plurality of AC/DC PFC power converters each having one or more power switches, a plurality of DC/DC power converters each having one or more power switches and an output, and a control circuit for controlling the power switches of the AC/DC PFC power converters and the power switches of the DC/DC power converters. The DC/DC power converters are coupled to the AC/DC PFC power converters. The power transfer switches correspond to the DC/DC power converters. The power transfer switches include a first power transfer switch coupled to the output of one respective DC/DC power converter of the DC/DC power converters. The first power transfer switch is configured to switch between a plurality of positions including a first position for coupling the output of the respective DC/DC power converter to the first set of LED luminaires, and a second position for coupling the output of the respective DC/DC power converter to the second set of LED luminaires.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a block diagram of a power transfer switch switchable between three positions for coupling a power source to three loads according to yet another example embodiment.

FIG. 8 is a block diagram of two power transfer switches each switchable between three positions for coupling a power source to three loads according to another example embodiment.

FIG. 9 is a block diagram of a power supply unit including an AC/DC PFC power converter and a DC/DC power converter employable in the centralized SMPS of FIG. 1, according to yet another example embodiment.

Corresponding reference numerals indicate corresponding parts and/or features throughout the several views of the drawings.

DETAILED DESCRIPTION

Figure 1:
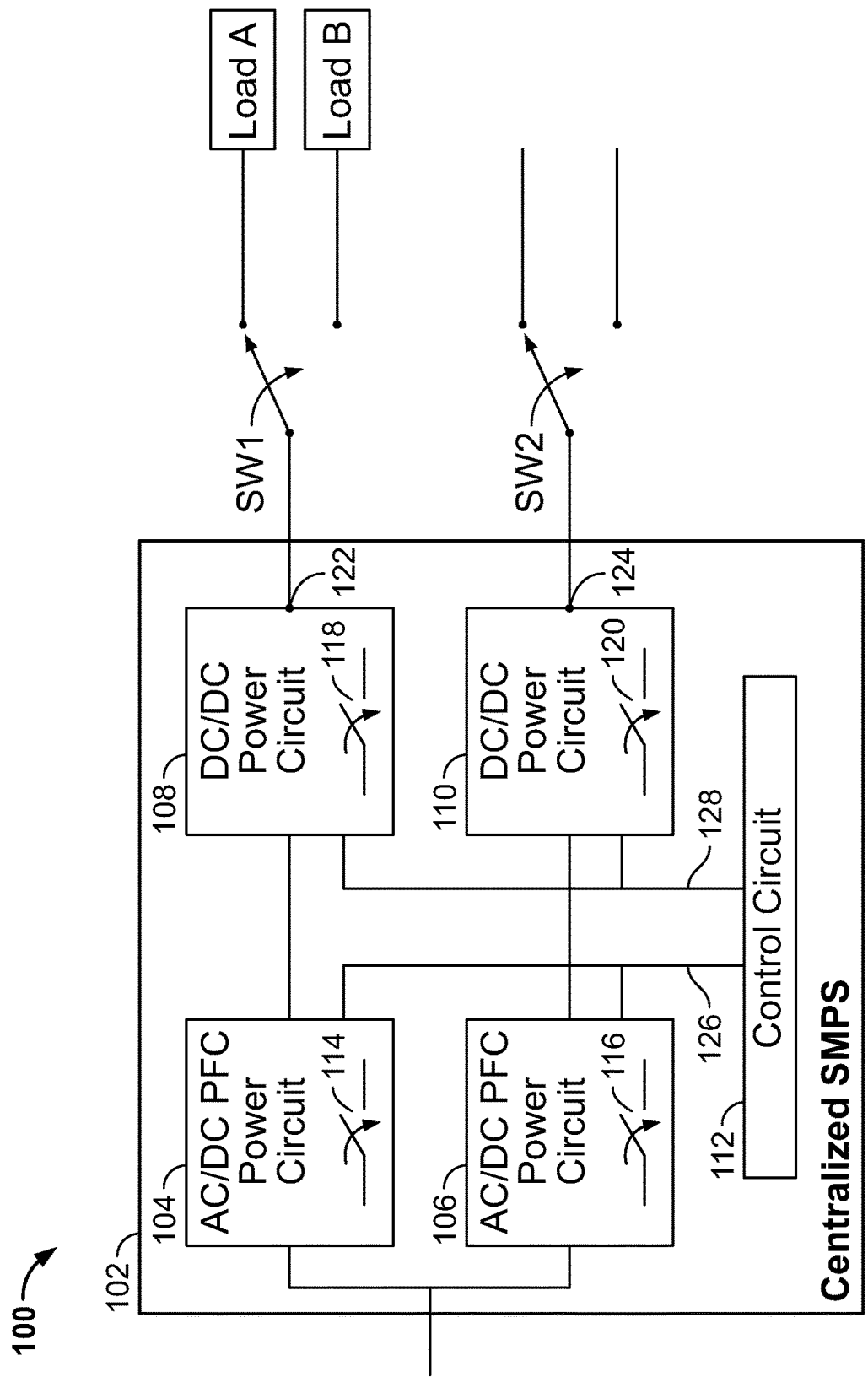
FIG. 1 is a block diagram of an electric power system including a centralized SMPS and multiple power transfer switches according to one example embodiment of the present disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

An electric power system for powering multiple DC loads according to one example embodiment of the present disclosure is illustrated in FIG. 1 and indicated generally by reference number 100. As shown in FIG. 1, the electric power system 100 includes a centralized SMPS 102 having two AC/DC PFC power converters 104, 106, two DC/DC power converters 108, 110 coupled to the AC/DC PFC power converters 104, 106, and a control circuit 112. The AC/DC PFC power converters 104, 106 each include one or more power switches 114, 116. The DC/DC power converters 108, 110 each include one or more power switches 118, 120 and an output 122, 124. The control circuit 112 controls the power switches 114, 116, 118, 120. As shown in FIG. 1, the system 100 further includes multiple power transfer switches SW1, SW2 corresponding to the DC/DC power converters 108, 110. For example, the power transfer switches SW1, SW2 are coupled to the outputs 122, 124 of the DC/DC power converters 108, 110, respectively. The power transfer switch SW1 is each configured to switch between a first position for coupling the output 122 of the DC/DC power converter 108 to a DC powered load A, and a second for coupling the output 122 of the DC/DC power converter 108 to a DC powered load B.

By employing one or more power transfer switches, the power system may utilize a single DC/DC power converter (e.g., a single DC power source) for powering different loads. For example, the DC powered loads A, B may not require an indefinite flow of power. This allows the single DC power source to power one load A for a period of time while the other load B is disconnected, and then power the other load B for a period of time while the other load A is disconnected. As such, power systems employing one or more power transfer switches may have a DC power source-to-DC load ratio of at least 1:2. Additionally, the single DC power source may operate nearly continuously by powering either the load A (at times), the load B (at other times), and/or another load (at still other times). Thus, the DC power source is not idle for extended periods of time as is conventional in power systems having a DC source-to-DC load ratio of 1:1.

Additionally, the centralized power supplies disclosed herein may experience a significant component reduction when a single DC power source is capable of powering multiple loads. For example, by having a DC power source-to-DC load ratio of at least 1:2, some power conversion circuitry (e.g., AC/DC PFC power converters, DC/DC power converters, etc.) is not required. As such, the centralized power supplies are significantly cheaper to produce and require significantly less space in power systems (while still providing the necessary power to loads) as compared to conventional power systems having a DC power source-to-DC load ratio of 1:1.

The power system 100 (and/or any other power system disclosed herein) may be operated to substantially prevent arcing in its power transfer switches. For example, and as shown in FIG. 1, the power transfer switch SW1 is in its first position for powering the load A. When it is desirable to provide power to the load B, the power transfer switch SW1 switches to its second position. In such examples, the power transfer switch SW1 may switch from the first position to the second position when an output current provided by the DC/DC power converter 108 falls to zero. For instance, the DC/DC power converter 108 may be disabled (e.g., turned off) for a period of time thereby causing its output current to fall to zero. This ensures current on the load sides (e.g., the current passing through the load A, and the current passing through the load B) is zero, and current on the source side (e.g., the output current of the DC/DC power converter 108) is zero. Once the current on both sides of the power transfer switch SW1 is zero, the power transfer switch SW1 may disconnect the output 122 from the load A, and connect the output 122 to the load B without experiencing an arc. After the power transfer switch SW1 is connected to the load B, the DC/DC power converter 108 may be enabled again (e.g., turned on).

In some embodiments, one or both power transfer switches SW1, SW2 may be manually operated power transfer switches. For example, the power transfer switches SW1, SW2 of FIG. 1 are shown as manually operated power transfer switches. In such examples, a user may manipulate each power transfer switch SW1, SW2 to force the switch between its first position and its second position as explained above.

Figure 2:
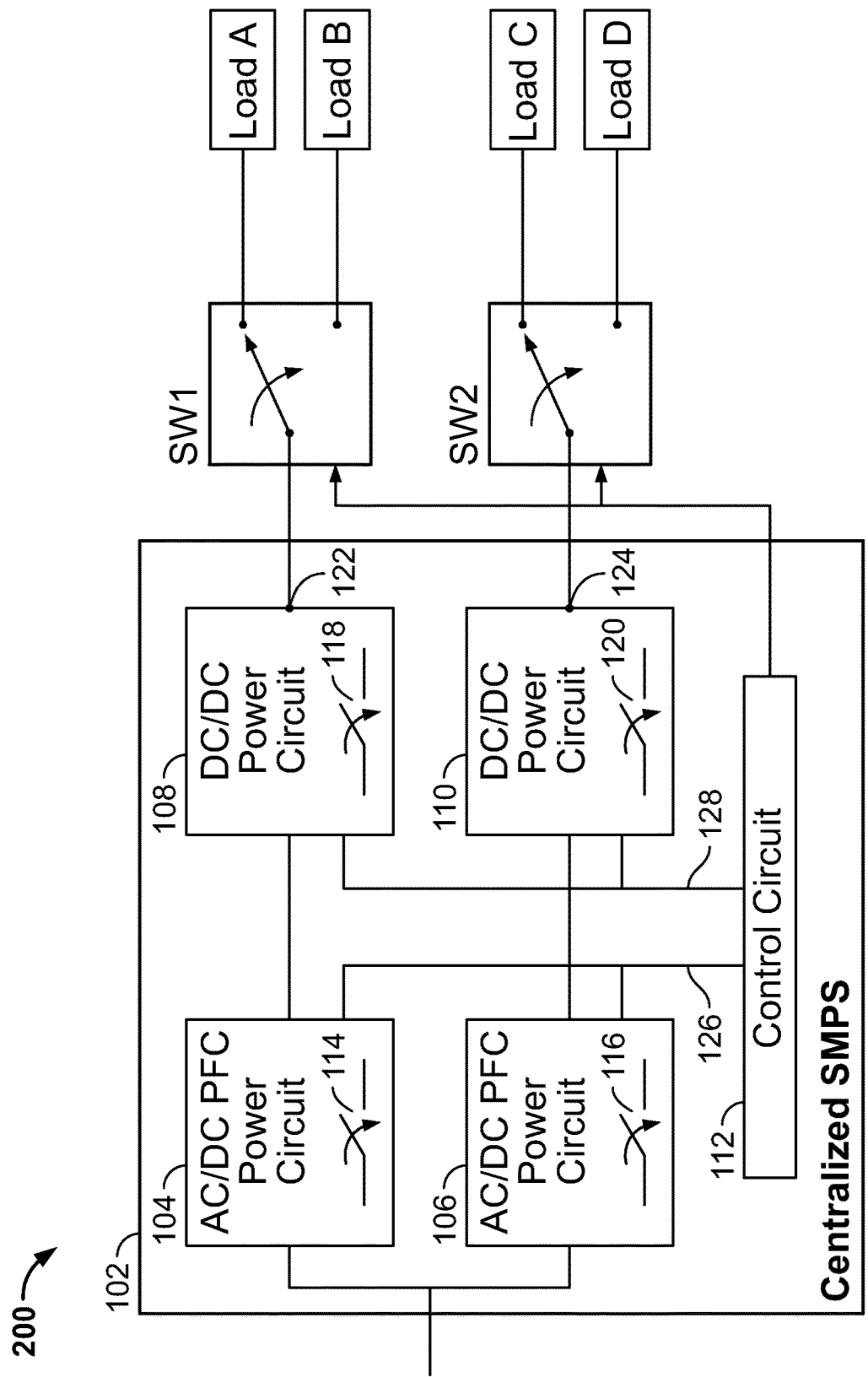
FIG. 2 is a block diagram of an electric power system including multiple controllable power transfer switches according to another example embodiment.

Alternatively, one or both power transfer switches SW1, SW2 may be controllable power transfer switches. In such examples, the power transfer switches may be switched based on one or more sensed parameters in the system, one or more programmable parameters (e.g., a set time), etc. For example, FIG. 2 illustrates an electric power system 200 including the centralized SMPS 102 of FIG. 1 for powering four DC powered loads A, B, C, D via two controllable power transfer switches SW1, SW2. The controllable power transfer switches SW1, SW2 operate in a similar manner as explained above. For example, and as shown in FIG. 2, each controllable power transfer switch SW1, SW2 is switched between its first position and its second position based on a control signal provided by the control circuit 112. When the controllable power transfer switch SW1 is in its first position, the output 122 of the DC/DC power converter 108 is coupled to the DC powered load A (as shown in FIG. 2), and when the controllable power transfer switch SW1 is in its second position, the output 122 of the DC/DC power converter 108 is coupled to the DC powered load B. When the controllable power transfer switch SW2 is in its first position, the output 124 of the DC/DC power converter 110 is coupled to the DC powered load C (as shown in FIG. 2), and when the controllable power transfer switch SW2 is in its second position, the output 124 of the DC/DC power converter 110 is coupled to the DC powered load D.

As shown in FIGS. 1 and 2, the control circuit 112 is in communication with the power converters 104, 106, 108, 110. For example, the control circuit 112 outputs one or more control signals 126, 128 for controlling the power switches 114, 116, 118, 120 (e.g., transistors, MOSFETs, etc.) of the power converters 104, 106, 108, 110. In some embodiments, the control signals 126, 128 may be provided to the power converters 104, 106, 108, 110 via a serial communication bus such as a controller area network (CAN), an RS485 interface, etc. The control signals 126, 128 may be generated based on received signals representing parameters of the power converters 104, 106, 108, 110, remote access control commands and/or and local access control commands as further explained below. The parameters may include, for example, a sensed current (e.g., an input current, an output current, etc.), and/or a sensed voltage (an input current, an output current, etc.) of the power converters.

In some embodiments, portions of the control circuit 112 may be associated with one or more of the power converters 104, 106, 108, 110. For example, the control circuit 112 may include one or more controllers (e.g., digital controllers) associated with the power converters 104, 106, 108, 110. In such examples, each power converter 104, 106, 108, 110 may include its own controller (e.g., each controller may be co-located with its respective power converter). The controllers associated with the power converters 104, 106, 108, 110 may be in communication with each other and/or other portions of the control circuit 112 via, for example, an internal CAN.

In some embodiments, one of the AC/DC PFC power converters 104, 106 and/or one of the DC/DC power converters 108, 110 may be part of an independent and separable power supply unit (e.g., a power module). For example, FIG. 9 illustrates a power supply unit PS1 that is positioned in the centralized SMPS 102 of FIG. 1. As shown, the power supply unit PS1 includes the AC/DC PFC power converter 104 and the DC/DC power converter 108. In the particular example of FIG. 9, the DC/DC power converter 108 includes power conversion circuitry 902 to convert a DC voltage provided by the AC/DC PFC power converter 104 into a regulated DC voltage, and current driver circuitry 904 (e.g., an LED driver) that functions as a constant current source for powering the loads A, B via the power transfer switch SW1. In such examples, the DC/DC power converter 108 can operate in a constant current mode.

Additionally, and as shown in FIG. 9, a digital control circuit 906 is co-located with the power conversion circuitry 902 and the current driver circuitry 904 in the DC/DC power converter 108. This digital control circuit 906 may be a portion of the control circuit 112 of FIG. 1 as explained above.

As shown in FIG. 9, the digital control circuit 906 is in communication with the power conversion circuitry 902 and the current driver circuitry 904. Specifically, the digital control circuit 906 may receive one or more signals representing sensed feedback parameters (e.g., an output voltage and/or output current). These signals may be passed to other portions of the control circuit 112 via communication interfaces (not shown) thereby allowing the control circuit 112 to generate the control signals 126, 128 for controlling the power switches 114, 116, 118, 120 as explained above. Alternatively, one or more control signals may be generated by the digital control circuit 906.

Figure 3:
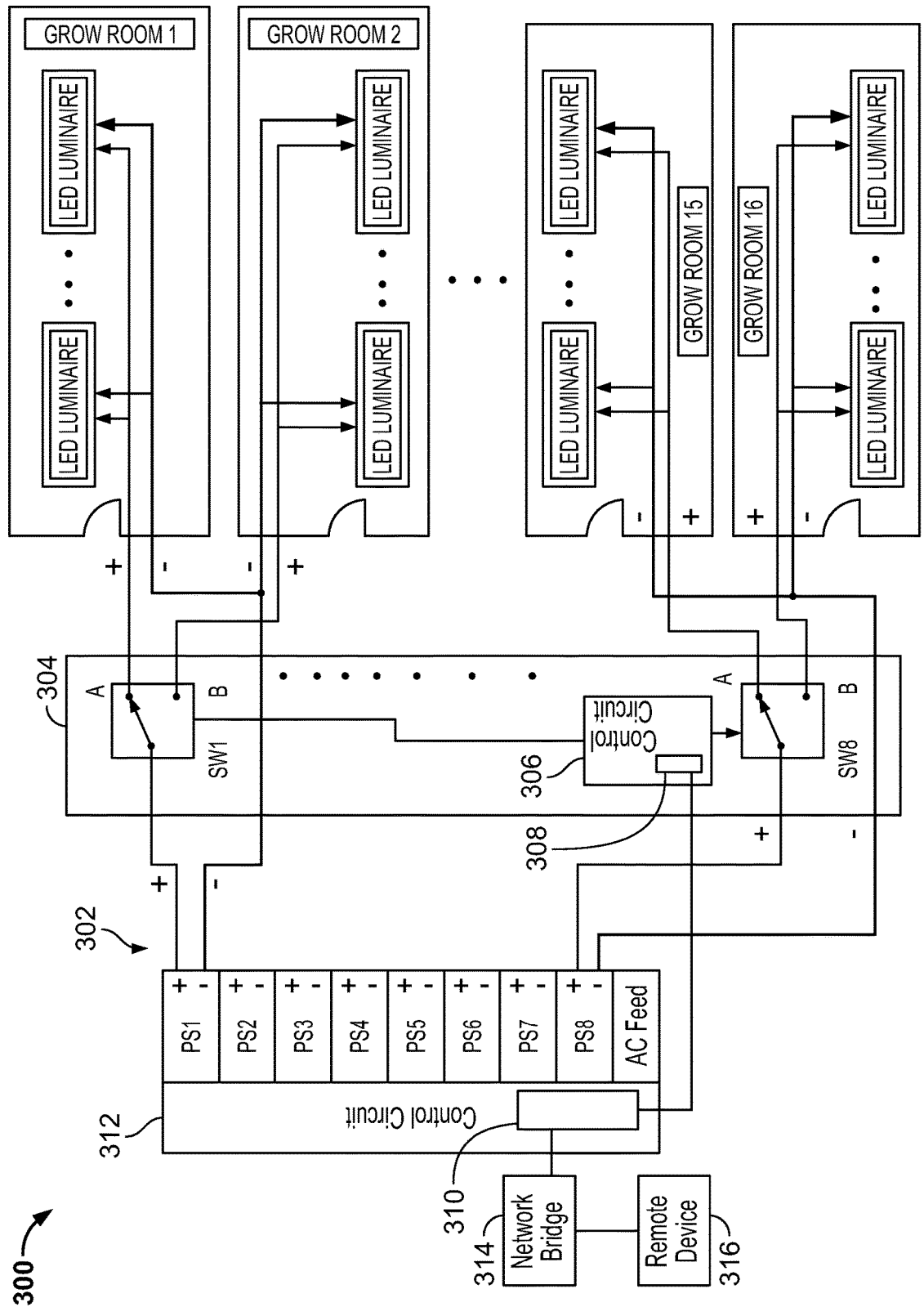
FIG. 3 is a block diagram of an indoor horticulture facility including a centralized SMPS and multiple controllable power transfer switches for powering strings of LED luminaires in different grow rooms of the indoor horticulture facility, according to yet another example embodiment.

The loads A, B, C, D of FIGS. 1 and/or 2 may be any suitable DC powered loads such as LED luminaires. In some examples, the LED luminaires may be positioned in different rooms (e.g. grow room 1, grow room 2, etc.) of an indoor horticulture facility (e.g., vertical farming facility, etc.) for growing plants. For example, FIG. 3 illustrates an electric power system 300 having a centralized SMPS 302 coupled to and powering a string of LED luminaires in different grow rooms. Specifically, one string of LED luminaires is positioned in each of the sixteen different grow rooms (grow room 1-grow room 16). In the particular example of FIG. 3, the electric power system 300 is an indoor horticulture facility.

As shown in FIG. 3, the centralized SMPS 302 includes eight power supply units PS1-PS8 and a control circuit 312 for controlling power switches (not shown) in the power supply units PS1-PS8. The power supply units PS1-PS8 each may include an AC/DC PFC power converter coupled to an AC feed and a DC/DC converter as explained above.

Additionally, the power system 300 includes a switch module 304 having eight controllable power transfer switches SW1-SW8 and a control circuit 306. The switch module 304 may be a component of the centralized SMPS 302. In such examples, the switch module 304 may be disposed in the centralized SMPS 302 to ensure all control circuitry is located central to the power supply 302. Alternatively, the switch module 304 may be separated from the centralized SMPS 302. In such cases, the switch module 304 may be positioned adjacent the grow rooms if desired.

In the example of FIG. 3, the control circuit 306 controls the controllable power transfer switches SW1-SW8. For example, the control circuit 306 may provide a control signal to each power transfer switch SW1-SW8 to cause the switch to transition between its first and second positions as explained above. In such examples, the string of LED luminaires (e.g., a set of two luminaires, a set of five luminaires, a set of ten luminaires, etc.) disposed in grow room 1 are powered by a DC/DC power converter of the power supply unit PS1 when the power transfer switch SW1 is in its first position, and the string of LED luminaires (e.g., a set of two luminaires, a set of five luminaires, a set of ten luminaires, etc.) disposed in grow room 2 are powered by the DC/DC power converter of the power supply unit PS1 when the power transfer switch SW1 is in its second position. Likewise, the string of LED luminaires disposed in grow room 15 are powered by a DC/DC power converter of the power supply unit PS8 when the power transfer switch SW8 is in its first position, and the string of LED luminaires disposed in grow room 16 are powered by the DC/DC power converter of the power supply unit PS8 when the power transfer switch SW8 is in its second position.

In some examples, some plants need only a certain amount (e.g., about 12 hours per day, etc.) of light for desired growth. As such, at least one of the controllable power transfer switches may be switched at a defined duty cycle. In such examples, the control circuit 306 may include a control device such as a counter, a timer, etc. for tracking the time spent in each position. For example, during a 24 hour switching period, the power transfer switch SW1 may be in its position A for about 12 hours to power the string of LED luminaires in the grow room 1, and in its position B for about the next 12 hours to power the string of LED luminaires in the grow room 2. As such, in this example, the power transfer switch SW1 has a duty cycle of about 50%. Alternatively, the power transfer switch SW1 (and/or any one of the other power transfer switches) may be switched at another suitable duty cycle depending on, for example, load requirements.

As shown in FIG. 3, the system 300 includes a network bridge 314 is in communication with a communication interface 310 of the control circuit 312. This allows the network bridge 314 to provide remote access control commands received from a device 316 remote from the centralized SMPS 302 to the control circuit 312. Additionally and/or alternatively, the remote device 316 may receive data relating to sensed parameters (e.g., current, voltages, temperatures, etc.) of the power supply units 1-8. For example, the network bridge 314 may be in communication with a communication port of the interface 310 via an Ethernet connection. In other examples, the network bridge 314 may be in communication with the control circuit 312 with another suitable connection such as a RS-485 serial connection, a controller area network (CAN) bus connection, etc.

The remote access control commands provided to the centralized SMPS 302 may enable the SMPS 302 to function as an Internet of Things (IoT) device. For example, the remote access control commands allow the centralized SMPS 302 to communicate with other devices over a network without requiring human-to-human or human-to-computer interaction. Specifically, a remote device is able to access, monitor, control, etc. the SMPS 302 anywhere in the world.

As shown in FIG. 3, the network bridge 314 is coupled between the control circuit 312 and the remote device 316. The network bridge 314 is used to create a communication network of the control network in the centralized SMPS 302 and one or more other networks remote from the SMPS 302. In some examples, the network bridge 314 may include one or more network switches and/or other suitable devices for connecting the control network in the centralized SMPS 302 and one or more other networks remote together.

As shown in FIG. 3, the control circuits 306, 312 are in communication with each other. For example, the control circuit 306 includes a communication interface 308 coupled to the communication interface 310 of the control circuit 312. In such examples, the interface 308 may be in communication with the interface 310 via an Ethernet connection, a RS-485 serial connection, a controller area network (CAN) bus connection, etc. This connection allows for bi-directional communication between the control circuits 306, 312. For example, the control circuit 312 may send control commands to the control circuit 306 to instruct the control circuit 306 to activate one or more of the power transfer switches SW1-SW8, the control circuit 306 may send signals representing switch positions, timer values, etc. to the control circuit 312, etc.

In some embodiments, the communication interfaces 308, 310 may be isolated communication (ISOCOMM) interfaces. In such examples, the ISOCOMM interface 310 may parse data, and provide supervisory communication and housekeeping functionality for each of the power supply units PS1-PS8. For example, the communication interface 310 may include a communication board with communication ports (e.g., ground isolated ports) for interfacing with the power supply units PS1-PS8 (e.g., interfacing with controllers co-located with each power converter as explained below), the remote device 316 and/or other devices.

Figure 4:
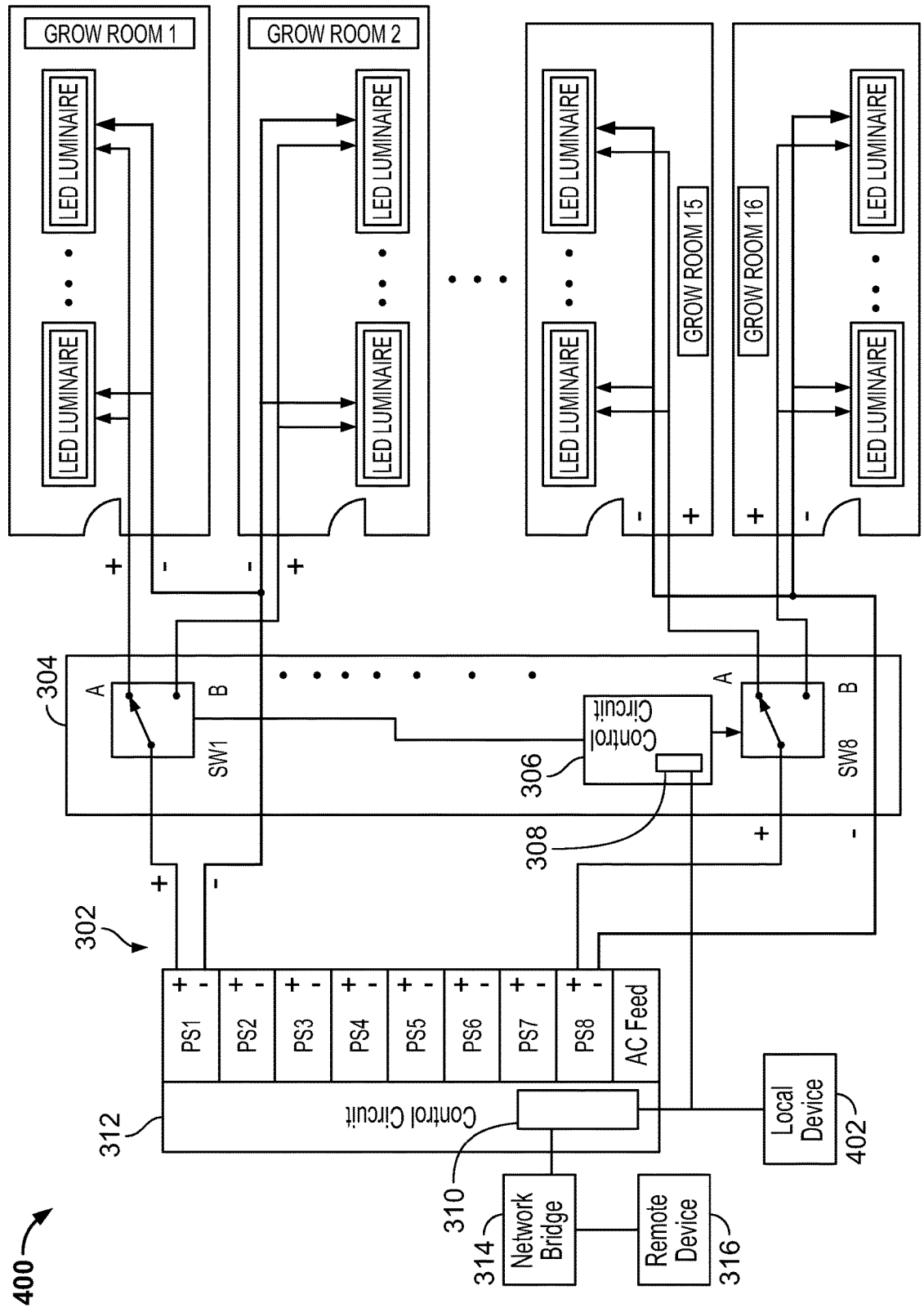
FIG. 4 is a block diagram of an indoor horticulture facility including multiple controllable power transfer switches controlled with local access control commands, according to another example embodiment.

In some embodiments, the control circuits 306, 312 may only receive control commands via the remote device 316. Additionally and/or alternatively, the control circuits 306, 312 may receive local access control commands provided by a local device. For example, FIG. 4 illustrates an indoor horticulture facility 400 (e.g., an electric power system) including the centralized SMPS 302 and the switch module 304 of FIG. 3 each receiving local access control commands and/or remote access control commands. As shown, the control circuits 306, 312 each may be in communication with a device 402 (e.g., a local computing device, etc.) for providing local access control commands (e.g., not over a communication network). The local access control commands may be used to control the controllable power transfer switches SW1-SW8 and/or power switches in the power supply units PS1-PS8. In the example of FIG. 4, the communication ports of the control circuits 306, 312 may be coupled to the device 402 and/or together via one or more RS-485 serial connections, CAN bus connections, Ethernet connections, etc.

Additionally, and as shown in FIG. 4, the communication interface 310 of the control circuit 312 is in communication with the network bridge 314 for providing remote access control commands from the remote device 316, providing data relating to sensed parameters of the power supply units 1-8 to the remote device 316, providing data relating to the power transfer switches SW1-SW8 to the remote device 316, etc. as explained above. These remote access control commands may be passed to the switch module's control circuit 306 via the communication interface 308 if desired.

Figure 5:
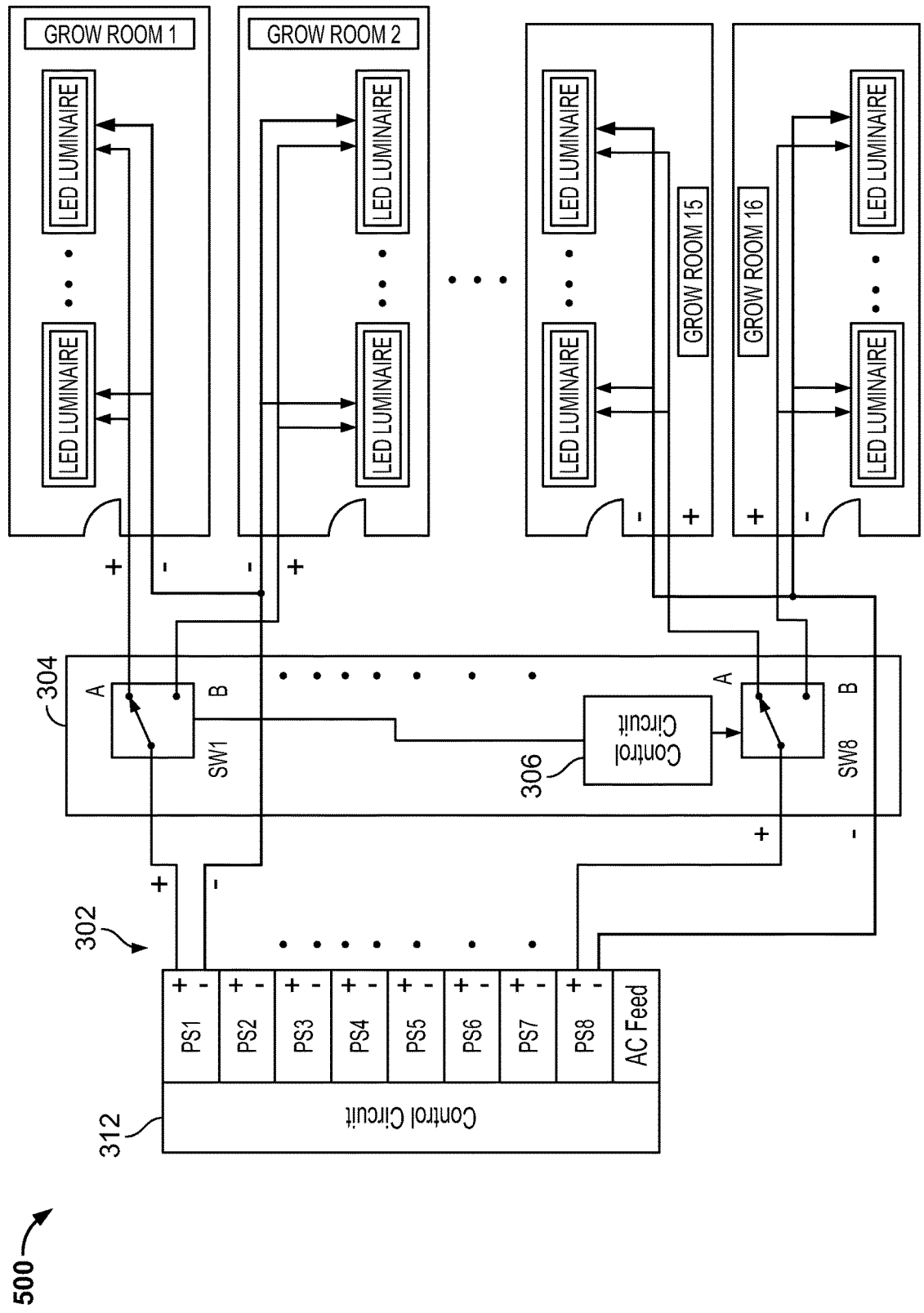
FIG. 5 is a block diagram of an indoor horticulture facility including a switch module having multiple controllable power transfer switches and an internal control circuit according to yet another example embodiment.

In some embodiments, the control circuit 306 may not be in communication with another device. For example, FIG. 5 illustrates an indoor horticulture facility 500 (e.g., an electric power system) including the centralized SMPS 302 and the switch module 304 of FIG. 3, where the control circuit 306 of the switch module 304 is independent from other devices such as the control circuit 312 in the SMPS 302. In such examples, the switch module's control circuit 306 may include a programmable timer, counter, etc. and a logic drive control for controlling the power transfer switches SW1-SW8 as explained herein.

In the particular example of FIG. 5, the control circuit 306 are housed within the switch module 304. As such, the same physical enclosure houses the power transfer switches SW1-SW8 and the control circuit 306 in FIG. 5.

In other examples, the control circuit 306 may be positioned external to the switch module 304. For example, FIG.

Figure 6:
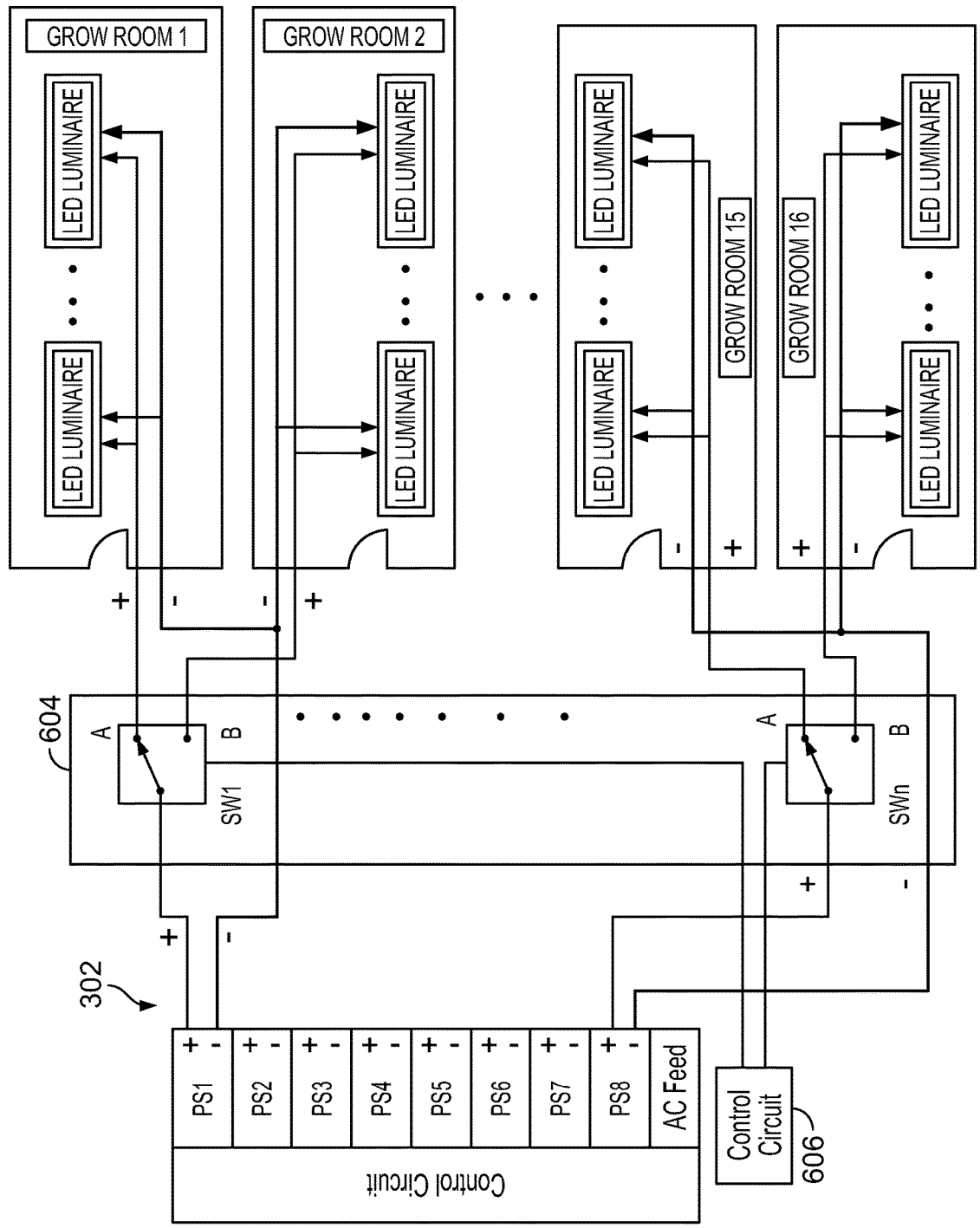
FIG. 6 is a block diagram of an indoor horticulture facility including a switch module having multiple controllable power transfer switches controlled with an external control circuit according to another example embodiment.

6 illustrates an indoor horticulture facility 600 (e.g., an electric power system) including the centralized SMPS 302, a switch module 604 including the power transfer switches SW1-SW8, and a control circuit 606 for controlling the power transfer switches SW1-SW8. The control circuit 606 of FIG. 6 is substantially similar to the control circuit 306 of FIG. 5. For example, the control circuit 606 of FIG. 6 is independent from other devices such as the control circuit 312 in the SMPS 302, and includes a programmable timer, counter, etc. and a logic drive control for controlling the power transfer switches SW1-SW8 as explained above. However, and as shown in FIG. 6, the control circuit 606 is positioned external to the switch module 304.

Although the indoor horticulture facilities 300, 400, 500, 600 of FIGS. 3-6 each include eight power supply units PS1-PS8 and eight power transfer switches SW1-SW8, it should be apparent that more or less power supply units and/or power transfer switches may be employed. For example, another suitable indoor horticulture facility may include four power supply units, ten power supply units, twelve power supply units, etc., and four power transfer switches, ten power transfer switches, twelve power transfer switches, etc. if desired.

In some examples, any one or more of the power transfer switches disclosed herein may be capable of switching between three or more positions. In such examples, the power transfer switch may be capable of coupling the output of a single DC/DC power converter to at least three DC powered loads (e.g., strings of LED luminaires in different grow rooms). For example, FIG. 7 illustrates a portion of an electric power system 700 including the power supply unit PS1 and the control circuit 312 of the centralized SMPS 302 shown in FIGS. 3-6. As shown in FIG. 7, the output of the power supply unit PS1 includes a line conductor 702 for coupling to at least three DC powered loads A, B, n via a power transfer switch SW, and a reference (e.g., ground) conductor 704 for coupling to the at least three DC powered loads A, B, n. In such examples, the line conductor 702 (but not the reference conductor 704) may be disconnected from at least two of the DC powered loads (e.g., the loads A, n as shown in FIG. 7). Alternatively, the reference conductor 704 (instead of the line conductor 702) may be coupled to the at least three DC powered loads A, B, n via the power transfer switch SW if desired.

Figure 12:
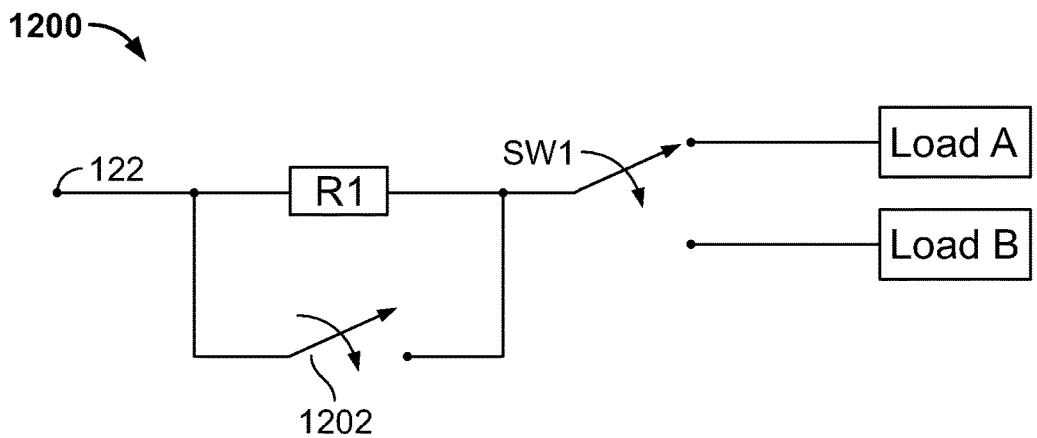
FIG. 12 is a circuit diagram of current protection circuitry including a resistor and a bypass switch according to another example embodiment.

In other examples, the line conductor 702 and the reference conductor 704 may be disconnected from some of the DC powered loads. In such examples, the DC powered loads not coupled to the output of the DC/DC power converter may be electrically isolated. For example, FIG. 8 illustrates a portion of an electric power system 800 including the power supply unit PS1 and the control circuit 312 of the centralized SMPS 302 shown in FIGS. 3-6. As shown in FIG. 8, the output of the power supply unit PS1 includes a line conductor 802 for coupling to at least three DC powered loads A, B, n via a power transfer switch SWa, and a reference (e.g., ground) conductor 804 for coupling to the at least three DC powered loads A, B, n via a power transfer switch SWb In some embodiments, the power systems (including the indoor horticulture facilities) disclosed herein may include outrush current protection circuitry coupled between each of the DC/DC converter's outputs and its corresponding power transfer switch. For example, FIG. 12 illustrates outrush current protection circuitry 1200 employable in any one of the power systems disclosed herein. As shown in FIG. 12, the outrush current protection circuitry 1200 includes a resistor R1 for limiting current flow and a bypass switch 1202 coupled in parallel with the resistor R1. The protection circuitry 1200 may be coupled in the supply line path (as shown in FIG. 12) or in the return path.

The current protection circuitry 1200 is coupled between a DC/DC power converter and its associated power transfer switch. For example, and as shown in FIG. 12, the resistor R1 and the bypass switch 1202 are coupled between the output 122 of the DC/DC power converter 108 and the power transfer switch SW1 of FIG. 1. Additionally and/or alternatively, the current protection circuitry 1200 (and/or other suitable current protection circuitry) may be coupled between the DC/DC power converter 110 and the power transfer switch SW2 of FIG. 1.

When operated, the protection circuitry 1200 may limit current flowing from the DC/DC power converter to the load. For example, and as shown in FIG. 12, when the DC/DC power converter 108 is coupled to the load A via the power transfer switch SW1 and the bypass switch 1202 is open, the resistor R1 limits the amount of current flowing to the load A. At a later point in time, the bypass switch 1202 may be closed to provide a current path from the DC/DC power converter 108 to the load A via the bypass switch 1202 and the power transfer switch SW1.

If it is desirable to provide power to the load B, the bypass switch 1202 may be opened forcing current to flow through the resistor R1. After which, the power transfer switch SW1 is switched so that the DC/DC power converter 108 is coupled to the load B. In such examples, the resistor R1 limits the amount of current flowing to the load A before the power transfer switch SW1 is operated, and the amount of current flowing to the load B after the power transfer switch SW1 is operated. As such, the same resistor R1 may limit the amount of current flowing from the power converter 108 to the loads A, B. At a later point in time, the bypass switch 1202 may be closed to provide a current path from the DC/DC power converter 108 to the load B via the bypass switch 1202 and the power transfer switch SW1.

The resistor R1 may be any suitable resistance. For example, the resistor R1 may be a resistor having a fixed value. Alternatively, the resistor R1 may be a resistor have a varying value such as a positive temperature coefficient (PTC) resistor, a negative temperature coefficient (NTC) resistor, etc.

The bypass switch 1202 may include any suitable switching device such as an electromechanical switch (e.g., a relay) or a semiconductor switch. In some examples where the resistor R1 is a PTC resistor or a NTC resistor, the bypass switch 1202 may be replaced with a passive component such as a capacitor.

In some embodiments, the protection circuitry 1200 may assist in preventing arcing in the power transfer switch SW1. For example, before the power transfer switch SW1 is switched to power the load A or the load B, the bypass switch 1202 may be opened thereby forcing current to flow through the resistor R1. This limits the amount of current flowing to the load A or the load B, and helps prevent arcing in the power transfer switch SW1. This may be particularly useful in examples where the power transfer switch SW1 is an electromechanical switch (e.g., a relay).

The centralized power supplies disclosed herein may include the same number of AC/DC PFC power converters and DC/DC power converters (e.g., a 1:1 ratio) as shown in FIGS. 1 and 2. In other embodiments, the number of AC/DC PFC power converters may be greater than the number of DC/DC power converters. This may allow the centralized power supplies to receive a variation of different input voltage levels and types (e.g. single phase, three phase, etc.).

Additionally, the centralized power supplies may provide a substantially higher DC voltage to each of the LED luminaires as compared to conventional power supplies. For example, each DC/DC power converter may output a voltage of 150 VDC, 177 VDC, 250 VDC, 260 VDC, etc. to each string of LED luminaires via the power transfer switch. In such examples, the centralized power supplies output a low DC current. For example, the DC/DC power converter may provide 12 amps and 250 VDC to obtain a 3 kW output. In contrast, conventional power supplies for powering LED luminaires commonly provide a low voltage/high current output. For instance, a conventional power supply for powering LED luminaires may provide 50 amps and 60 VDC to obtain the same 3 kW output. By providing a high voltage/low current output, energy losses due to conductor resistances may substantially reduced as compared to conventional power supplies that provide a low voltage/high current output.

The centralized power supplies disclosed herein may be placed in a room, a housing, etc. separate from the DC powered loads. For example, any one of the centralized power supplies may be placed in a control room of a horticulture facility and strings of LED luminaires may be placed in different grow rooms of the horticulture facility.

In other examples, the power systems disclosed herein may be employed in other suitable LED applications such as streetlight applications, etc. In such examples, the centralized power supplies may be placed in a distinct housing for powering LED luminaires in different streetlights (remote from the housing), etc.

For example, when the power systems are employed in streetlight applications, a single DC power source in a centralized power supply may power LED luminaires in different streetlights along a street. For instance, the streetlights may include one or more devices for detecting movement of an object (e.g., a person, a vehicle, etc.). In such examples, the detected movement of the object may function as a trigger event for switching a power transfer switch coupled between different streetlights and the single DC power source.

Figure 10:
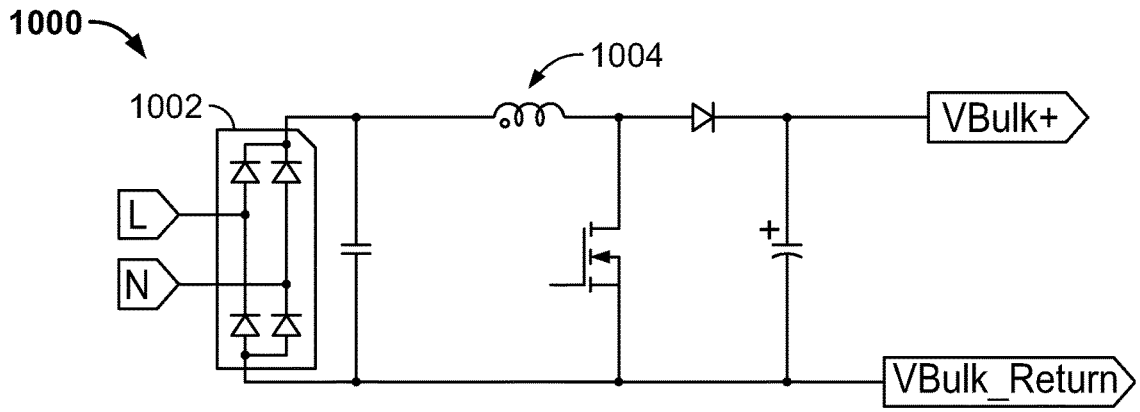
FIG. 10 is a circuit diagram of an AC/DC PFC power converter including a power circuit having a boost topology according to another example embodiment.
Figure 11:
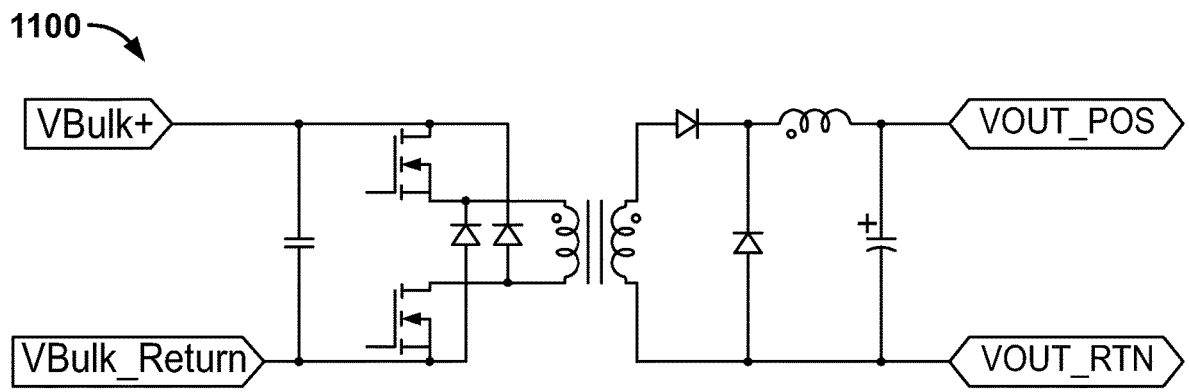
FIG. 11 is a circuit diagram of a DC/DC power converter including a power circuit having a forward converter topology according to yet another example embodiment.

The power converters disclosed herein may include any suitable topology. For example, the AC/DC PFC power converters may have boost, flyback, etc. topologies (including their resonant counterparts where applicable), and the DC/DC power converters may have buck, boost, forward, flyback, push-pull, half-bridge, full-bridge, etc. topologies (including their resonant counterparts where applicable). For instance, FIG. 10 illustrates an AC/DC PFC power converter 1000 including a diode bridge rectifier 1002 and a PFC power circuit 1004 having a boost topology. Additionally, FIG. 11 illustrates a DC/DC power converter 1100 including a power circuit having a forward converter topology.

The DC/DC power converters each may include current driver circuitry (e.g., an LED driver) that functions as a constant current source. This enables each DC/DC power converter to output (and adjust) a constant current to its corresponding loads such as LED luminaires via a DC distribution bus to control the light intensity of the LED luminaires thereby simulating a daylight profile appropriate for growing specific crops in the indoor horticulture facility. This light intensity may be controlled based on temperature, humidity, time, etc. As a result, higher crop yields and shorter grow times may be achieved.

The control circuits disclosed herein may include an analog control circuit, a digital control circuit, or a hybrid control circuit (e.g., a digital control unit and an analog circuit). The digital control circuits (e.g., the digital control circuit 906 of FIG. 9) may be implemented with one or more types of digital control circuitry. For example, the digital control circuits each may include a digital signal controller (DSC), a digital signal processor (DSP), a microcontroller unit (MCU), a field-programmable gate array (FPGA), an application-specific IC (ASIC), etc.

In some examples, any one of the control circuits may be implemented entirely with digital control. In other words, the control circuits may not include analog control circuitry (e.g., D/A converters, etc.) and/or analog signals for controlling power switches in the centralized power supplies and the power transfer switches. In such examples, the communication control signals are digital communication control signals.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

The power transfer switches disclosed herein may include any suitable switching device. For example, any one or more of the power transfer switches may include electromechanical switches such as relays. The relays may include, for example, single-pole single-throw (SPST) relays, single-pole double-throw (SPDT) relays, double-pole single-throw (DPST) relays, a double-pole double-throw (DPDT) relays, etc. In other examples, the power transfer switches may include semiconductor switches. For example, the power transfer switches may include one or more semiconductor switches such as silicon (Si) MOSFETs, silicon carbide (SiC) MOSFETs, back-to-back Si/SiC MOSFETs, insulated gate bipolar transistors (IGBTs), back-to-back IGBTs with anti-parallel diodes, etc.

The power systems (including the indoor horticulture facilities) disclosed herein provide significant advantages over conventional power systems. For example, and as explained above, the power systems each may utilize a single DC power source for powering two or more different loads. As such, the power systems employing the power transfer switches may have a DC power source-to-DC load ratio of 1:2, 1:3, etc. Thus, the single DC power source may operate nearly continuously when powering multiple loads at different times. As a result, the efficiency of powering multiple loads is increased as compared to conventional in power systems having a DC source-to-DC load ratio of 1:1.

Additionally, and as explained above, the centralized power supplies disclosed herein may experience a significant component reduction when a single DC power source is capable of powering multiple loads. As such, the centralized power supplies are significantly cheaper to produce and require significantly less space in power systems as compared to conventional power systems having a DC power source-to-DC load ratio of 1:1.

Further, by employing any one of the centralized power supplies disclosed herein, installation, maintenance and control of LED loads in different system applications (e.g., horticulture facilities, etc.) may be improved as compared to conventional distributed power supplies. For example, the centralized power supplies include all control components, control lines, and power conversion components in a central location remote from the LED loads thereby allowing for more convenient installation, maintenance, control flexibility, etc. of the power supplies as compared to conventional power supplies.

In some instances, component reliability in the centralized power supplies employed in horticulture facilities may be improved as compared to conventional distributed power supplies. This is due to placing control and power conversion circuitry outside of growing rooms. As a result, the adverse effects of humidity and water, dust, etc. ingress present in the growing rooms are not realized by the centralized power supplies.

Additionally, the centralized power supplies may reduce temperatures in areas where the LED loads are located (e.g., in grow rooms, etc.) as compared to conventional power supplies. This is because the LED loads do not include heat generating power conversion circuitry. As a result, less cooling systems (and associated costs) are required to maintain acceptable temperatures in the areas where the LED loads are located as compared to conventional power supplies in LED applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An indoor horticulture facility utilizing a plurality of LED luminaires for growing plants in one or more grow rooms, the indoor horticulture facility comprising:
   a first set of LED luminaires of the plurality of LED luminaires disposed in a grow room in the indoor horticulture facility, the first set of LED luminaires configured to provide light to at least one plant in the grow room;
   a second set of LED luminaires of the plurality of LED luminaires disposed in another grow room in the indoor horticulture facility, the set of second LED luminaires configured to provide light to at least one plant in the other grow room;
   a centralized switched mode power supply including a plurality of AC/DC PFC power converters each having one or more power switches, a plurality of DC/DC power converters coupled to the plurality of AC/DC PFC power converters, the plurality of DC/DC power converters each having one or more power switches and an output, and a control circuit for controlling the power switches of the AC/DC PFC power converters and the power switches of the DC/DC power converters; and
   a plurality of power transfer switches corresponding to the DC/DC power converters, the plurality of power transfer switches including a first power transfer switch coupled to the output of one respective DC/DC power converter of the DC/DC power converters, the first power transfer switch configured to switch between a plurality of positions including a first position for coupling the output of the respective DC/DC power converter to the first set of LED luminaires disposed in the grow room, and a second position for coupling the output of the respective DC/DC power converter to the second set of LED luminaires disposed in the other grow room.

2. The indoor horticulture facility of claim 1 wherein the first power transfer switch is a manually operated power transfer switch.

3. The indoor horticulture facility of claim 1 wherein the first power transfer switch is a controllable power transfer switch.

4. The indoor horticulture facility of claim 1 wherein the plurality of power transfer switches are disposed in a transfer switch module.

5. The indoor horticulture facility of claim 4 wherein the control circuit is a first control circuit, and wherein the indoor horticulture facility further comprises a second control circuit for controlling the power transfer switches.

6. The indoor horticulture facility of claim 5 wherein the second control circuit is disposed in the transfer switch module.

7. The indoor horticulture facility of claim 5 wherein the second control circuit receives local access control commands for controlling the power transfer switches.

8. The indoor horticulture facility of claim 5 wherein the second control circuit includes a communication interface for receiving control commands from the first control circuit for controlling the power transfer switches.

9. The indoor horticulture facility of claim 1 wherein the first power transfer switch is configured to be in its first position for the first 12 hours of a 24-hour period and in its second position for the next 12 hours of the 24-hour period.

10. The indoor horticulture facility of claim 1 wherein the first power transfer switch is configured to switch between the first position and the second position when an output current provided by the respective DC/DC power converter is substantially zero to prevent arcing in the first power transfer switch.

11. The indoor horticulture facility of claim 1 wherein the control circuit includes a communication interface, and wherein the indoor horticulture facility further comprises a network bridge in communication with the communication interface for providing remote access control commands received from a device remote from the centralized switched mode power supply to the control circuit for controlling the power switches of the AC/DC PFC power converters and the power switches of the DC/DC power converters.

12. The indoor horticulture facility of claim 1 wherein the centralized switched mode power supply is operated to provide at least 150 volts to the first set of LED luminaires and the second set of LED luminaires.

13. The indoor horticulture facility of claim 1 further comprising a third set of LED luminaires of the plurality of LED luminaires disposed in yet another grow room of the one or more grow rooms in the indoor horticulture facility, wherein the plurality of positions of the first power transfer switch includes a third position and wherein the first power transfer switch is configured to switch to the third position for coupling the output of the respective DC/DC power converter to the third set of LED luminaires.

14. The indoor horticulture facility of claim 1 wherein the output of the respective DC/DC power converter includes a line conductor and a reference conductor, wherein one of the line conductor and the reference conductor is coupled to the first set of LED luminaires and the second set of LED luminaires, and wherein the other one of the line conductor and the reference conductor is coupled to at least one of the first set of LED luminaires and the second set of LED luminaires via the first power transfer switch.

15. The indoor horticulture facility of claim 1 wherein the output of the respective DC/DC power converter includes a line conductor and a reference conductor, wherein the plurality of power transfer switches includes a second power transfer switch coupled to the output of the respective DC/DC power converter, wherein the line conductor is coupled to at least one of the first LED set of luminaires and the second set of LED luminaires via the first power transfer switch, and wherein the reference conductor is coupled to at least one of the first set of LED luminaires and the second set of LED luminaires via the second power transfer switch.

16. The indoor horticulture facility of claim 1 further comprising current protection circuitry coupled between the output of the respective DC/DC power converter and the first power transfer switch.

17. The indoor horticulture facility of claim 16 wherein the current protection circuitry includes a resistor.

18. The indoor horticulture facility of claim 17 wherein the current protection circuitry includes a bypass switch coupled in parallel with the resistor.

19. The indoor horticulture facility of claim 17 wherein the resistor is a negative temperature coefficient (NTC) resistor or a positive temperature coefficient (PTC) resistor.

* * * * *